United States Patent
Widder

(10) Patent No.: US 10,698,621 B2
(45) Date of Patent: Jun. 30, 2020

(54) BLOCK REUSE FOR MEMORY OPERATIONS

(71) Applicant: Western Digital Technologies, Inc., San Jose, CA (US)

(72) Inventor: Eyal Widder, Ramat Gan (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/959,852

(22) Filed: Apr. 23, 2018

(65) Prior Publication Data

US 2019/0324669 A1 Oct. 24, 2019

(51) Int. Cl.
*G06F 3/06* (2006.01)
*G06F 12/1009* (2016.01)

(52) U.S. Cl.
CPC .......... *G06F 3/0631* (2013.01); *G06F 3/0604* (2013.01); *G06F 3/0652* (2013.01); *G06F 3/0673* (2013.01); *G06F 12/1009* (2013.01); *G06F 2212/1044* (2013.01); *G06F 2212/657* (2013.01)

(58) Field of Classification Search
CPC .... G06F 3/0631; G06F 3/0604; G06F 3/0652; G06F 3/0673; G06F 3/064; G06F 3/0656; G06F 12/1009; G06F 12/10; G06F 12/023; G06F 12/0246; G06F 12/0253; G06F 12/0261; G06F 2212/1044; G06F 2212/657; G06F 2212/7201; G06F 2212/7203; G06F 2212/7202; G06F 2212/7207; G06F 2212/7211; G06F 2212/7209; G06F 2212/7205
See application file for complete search history.

(56) References Cited

U.S. PATENT DOCUMENTS

| | | | |
|---|---|---|---|
| 6,000,006 A * | 12/1999 | Bruce | G06F 11/1068 711/103 |
| 9,542,286 B2 | 1/2017 | Bar et al. | |
| 9,582,358 B2 | 2/2017 | Agarwal et al. | |
| 2008/0098192 A1* | 4/2008 | Im | G06F 12/0246 711/170 |
| 2012/0023306 A1 | 1/2012 | Chase | |
| 2012/0047345 A1* | 2/2012 | Hatfield | G06F 3/0608 711/165 |

(Continued)

*Primary Examiner* — Tracy A Warren
(74) *Attorney, Agent, or Firm* — Kunzler Bean & Adamson, PC

(57) ABSTRACT

Apparatuses, systems, and methods are disclosed for block reuse for memory operations. An apparatus may include one or more storage elements and a controller. A controller may be configured to manage a metadata structure and a metadata change structure. In certain embodiments, the metadata structure stores metadata relating to the one or more storage regions and the metadata change structure stores changes to be made to the metadata structure. A controller may be configured to perform an availability check to determine if one or more presently allocated storage regions identified in a metadata change structure are reusable. A controller may be configured to allocate one of a storage region from one or more presently allocated storage regions and a free storage region from a free memory group based on an availability check.

18 Claims, 7 Drawing Sheets

(56) References Cited

U.S. PATENT DOCUMENTS

| | | | |
|---|---|---|---|
| 2014/0075142 A1* | 3/2014 | Hom | G06F 12/10 |
| | | | 711/170 |
| 2014/0372486 A1 | 12/2014 | Bose et al. | |
| 2015/0149692 A1* | 5/2015 | Wang | G06F 11/14 |
| | | | 711/103 |
| 2017/0068470 A1* | 3/2017 | Ravimohan | G06F 12/0246 |
| 2017/0300250 A1* | 10/2017 | Sterns | G06F 3/065 |

* cited by examiner

BLOCK REUSE FOR MEMORY OPERATIONS

TECHNICAL FIELD

The present disclosure, in various embodiments, relates to non-volatile memory and more particularly relates to block reuse for memory operations.

BACKGROUND

Various types of memory devices use large metadata structures to store information about the memory. For example, some memory devices may use a global address table (GAT) to store logical to physical mapping information for the memory device and an inverse global address table (iGAT) to store physical to logical mapping information for the memory device. In certain embodiments, a GAT may use a logical block address (LBA) as a key to a physical block address (PBA) for the memory device. Conversely, an iGAT may use a PBA as a key to an LBA for the memory device. Certain metadata structures such as a GAT or an iGAT may be large and may be stored in block- or page-addressable non-volatile memory rather than in byte-addressable volatile memory. Thus, changing the metadata may involve reading a portion of the metadata structure into volatile memory, modifying that portion, and writing it back to non-volatile memory. To avoid frequent read-modify-write operations, changes to metadata may be aggregated in a queue or buffer, which may be flushed (e.g., periodically, or when full) by writing the changes to the larger metadata structure.

SUMMARY

Apparatuses are presented for block reuse for memory operations. An apparatus, in one embodiment, includes one or more storage elements and a controller. A controller, in one embodiment is configured to manage a metadata structure and a metadata change structure. In a further embodiment, a metadata structure stores metadata relating to one or more storage regions and a metadata change structure stores changes to be made to the metadata structure. In another embodiment, a controller is configured to perform an availability check to determine if one or more presently allocated storage regions identified in a metadata change structure are reusable. In a further embodiment, a controller is configured to allocate one of a storage region from one or more presently allocated storage regions and a free storage region from a free memory group based on an availability check.

Methods are presented for block reuse for memory operations. In one embodiment, a method includes handling a plurality of memory requests. In further embodiments, changes to a metadata structure that stores metadata relating to a plurality of memory requests are stored in a metadata change structure. In a certain embodiment, a method includes reallocating a presently allocated storage region in response to a first memory request in a plurality of memory requests based on the presently allocated storage region satisfying a validity threshold and a reallocation threshold. In another embodiment, the presently allocated storage region is identified in a metadata change structure. In a further embodiment, a method includes allocating a free storage region in one or more free storage regions in response to a second memory request in a plurality of memory requests based on a determination that no presently allocated storage regions satisfy a validity threshold and a reallocation threshold.

An apparatus, in another embodiment, includes means for comparing an amount of data stored on a previously allocated storage region against a validity threshold. In a certain embodiment, an apparatus includes means for wear leveling for a previously allocated storage region based on a reuse counter associated with the previously allocated storage region being less than a reallocation threshold, the reallocation threshold defining a limit for how many times a presently allocated storage region can be reallocated. In an additional embodiment, an apparatus includes means for reallocating the presently allocated storage region based on the comparison of the presently allocated storage region against the validity threshold and the reallocation threshold.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered limiting of the scope of the disclosure, the disclosure is described and explained with additional specificity and detail through the use of the accompanying drawings, in which.

DETAILED DESCRIPTION

Figure 1:
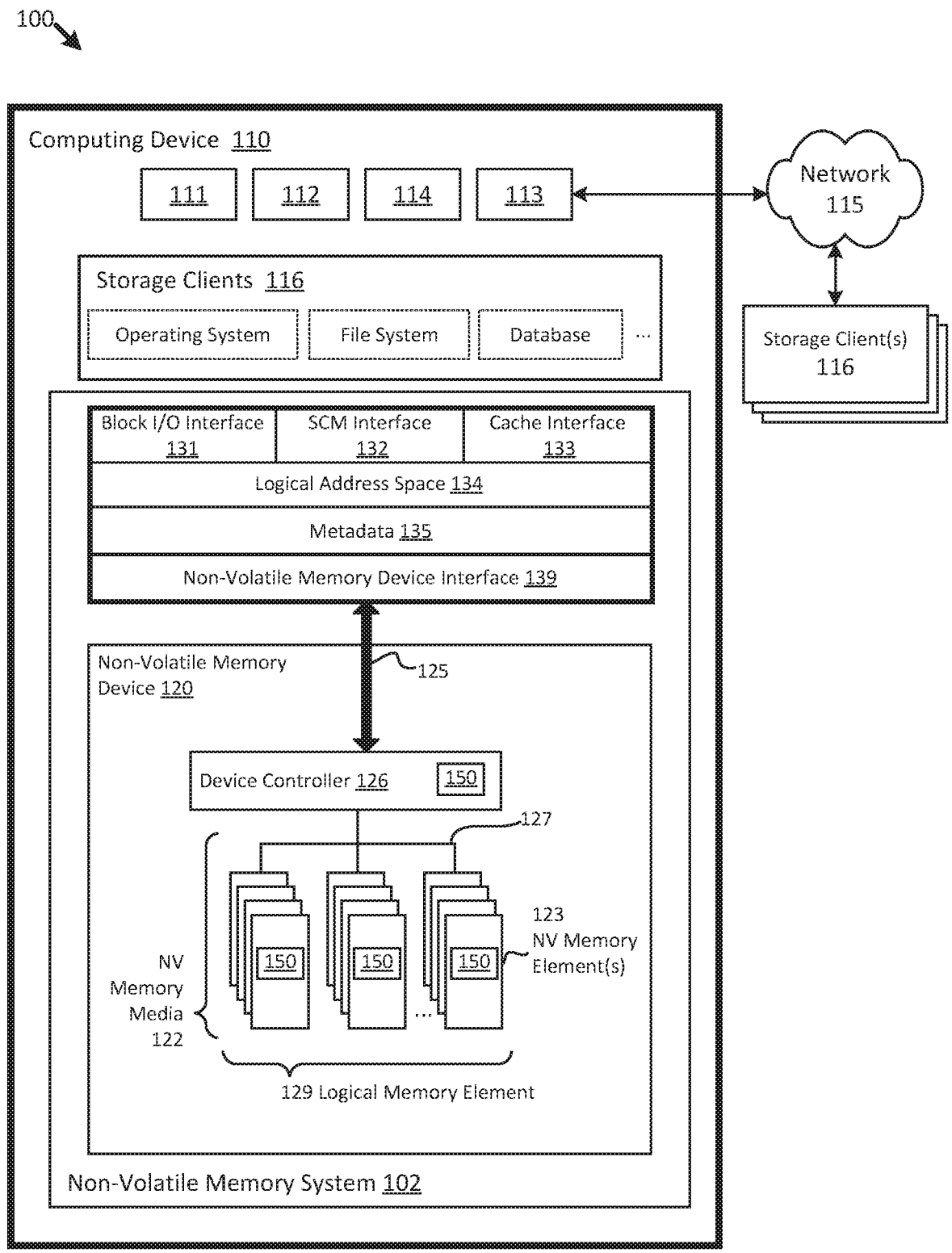
FIG. 1 is a schematic block diagram illustrating one embodiment of a system comprising non-volatile memory elements.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 comprising one or more memory allocation components me and for a non-volatile memory device 120. Memory allocation components 150 may be part of one or more non-volatile memory elements 123, a device controller 126 external to the non-volatile memory elements 123, a device driver, or the like. Memory allocation components 150 may be part of a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or device controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein.

The non-volatile memory system 102, in the depicted embodiment, includes one or more memory allocation components 150. A memory allocation component 150, in one embodiment, may be configured to reallocate one or more storage regions identified in a metadata change structure based on whether a storage region satisfies an availability check. By reallocating storage regions identified in the metadata change structure, a memory allocation component 150 may be able to improve random write performance. In particular, changes to be made to a metadata structure may be stored in a metadata change structure. In certain embodiments, when changes to the metadata structure fill the metadata change structure, the changes may be flushed from the metadata change structure and made to the metadata structure. In at least one embodiment, by reallocating memory identified in the metadata change structure, the metadata change structure may become filled less frequently. By becoming filled less often, the metadata change structure may be likewise flushed less frequently. As the changes are flushed less frequently from the metadata change structure to the metadata structure, the metadata structure may be loaded less frequently into memory, leading to improved performance of the memory device. Memory allocation components 150 are described in greater detail below with regard to FIGS. 2-11C.

In one embodiment, a memory allocation component 150 may include logic hardware of one or more non-volatile memory devices 120, such as a device controller 126, a non-volatile memory element 123, other programmable logic, firmware for a non-volatile memory element 123, microcode for execution by a non-volatile memory element 123, or the like. In another embodiment, a memory allocation component 150 may include executable software code, stored on a computer readable storage medium for execution by logic hardware of a non-volatile memory element 123. In a further embodiment, a memory allocation component 150 may include a combination of both executable software code and logic hardware.

In one embodiment, the non-volatile memory device 120 is configured to receive storage requests from a device driver or other executable application via buses 125, 127, a device controller 126, or the like. The non-volatile memory device 120 may be further configured to transfer data to/from a device driver and/or storage clients 116 via the bus 125. Accordingly, the non-volatile memory device 120, in some embodiments, may comprise and/or be in communication with one or more direct memory access (DMA) modules, remote DMA modules, bus controllers, bridges, buffers, and so on to facilitate the transfer of storage requests and associated data. In another embodiment, the non-volatile memory device 120 may receive storage requests as an API call from a storage client 116, as an IO-CTL command, or the like.

According to various embodiments, a device controller 126 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the device controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or communication interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective device controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more device controllers 126.

A device driver may present a logical address space 134 to the storage clients 116 through one or more interfaces. As discussed above, the logical address space 134 may comprise a plurality of logical addresses, each corresponding to respective media locations the on one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the device controller 126 to a network 115 and/or to one or more remote, network-accessible storage clients 116. The storage clients 116 may include local storage clients 116 operating on the computing device 110 and/or remote, storage clients 116 accessible via the network 115 and/or the communication interface 113. The device controller 126 is part of and/or in communication with one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: resistive random access memory (ReRAM), Memristor memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like. Similarly, a non-volatile memory element 123, in various embodiments, may comprise a non-volatile recording element, a non-volatile memory element, a non-volatile storage element, or the like.

The non-volatile memory media 122 may comprise one or more non-volatile memory elements 123, which may include, but are not limited to: chips, packages, planes, die, or the like. A device controller 126, external to the one or more non-volatile memory elements 123, may be configured to manage data operations on the non-volatile memory media 122, and may comprise one or more processors, programmable processors (e.g., FPGAs), ASICs, microcontrollers, or the like. In some embodiments, the device controller 126 is configured to store data on and/or read data from the non-volatile memory media 122, to transfer data to/from the non-volatile memory device 120, and so on.

The device controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the device controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The device controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the device controller 126 over a bus 125, as described above.

Figure 2:
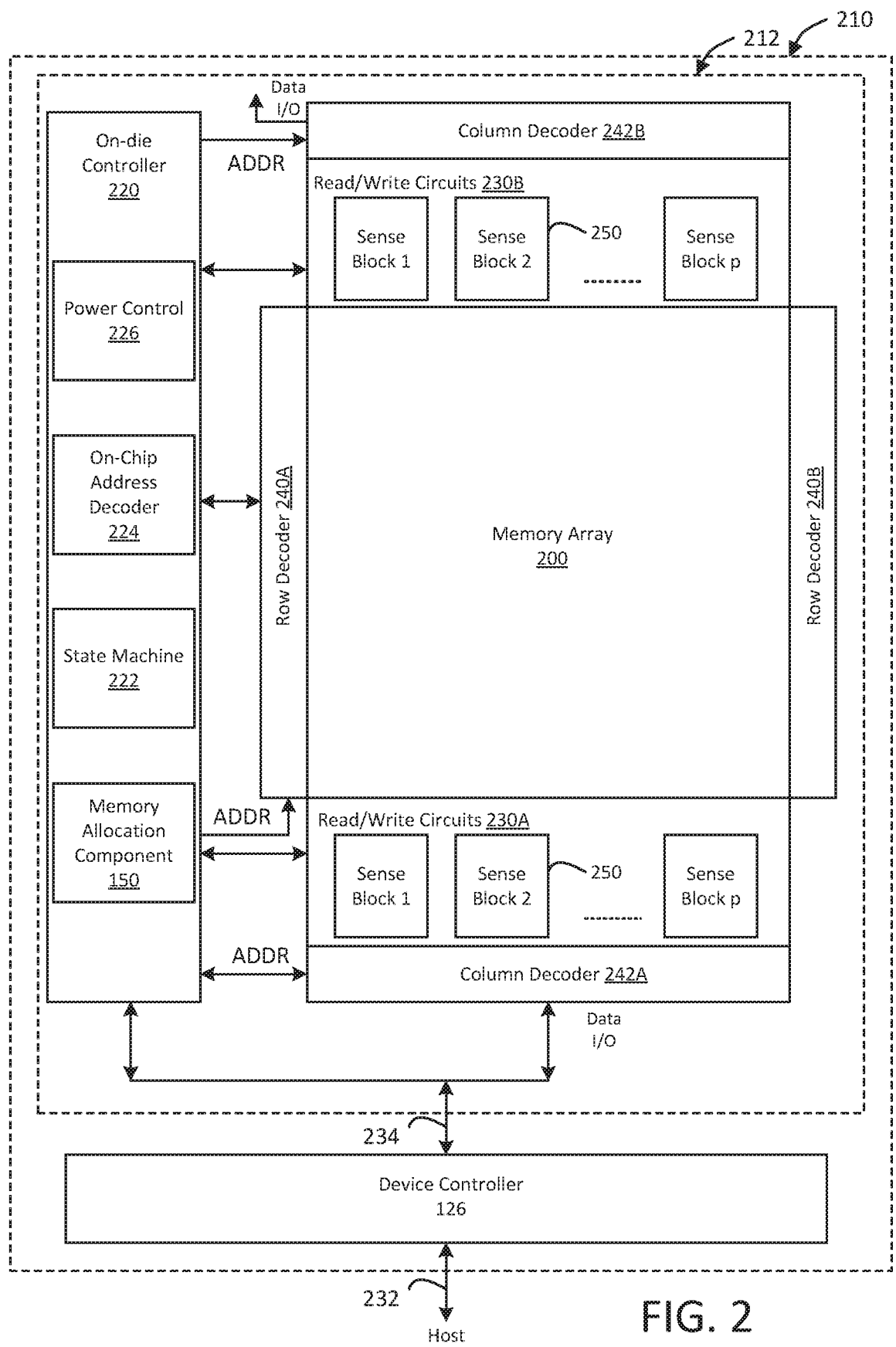
FIG. 2 is a schematic block diagram illustrating another embodiment of a system comprising non-volatile memory elements.

FIG. 2 illustrates an embodiment of a non-volatile storage device 210 that may include one or more memory die or chips 212. A memory die or chip 212 may be a non-volatile memory element 123 as described above with regard to FIG. 1. The non-volatile storage device 210 may be substantially similar to the nonvolatile memory device 120 described with reference to FIG. 1. Memory die 212, in some embodiments, includes an array (two-dimensional or three-dimensional) of memory cells 200, an on-die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel. In the depicted embodiment, peripheral circuits such as row decoders 240A/240B, column decoders 242A/242B, and read/write circuits 230A/230B are disposed at the edges of the memory array. In another embodiment, however, peripheral circuitry may be disposed above, below, and/or at the sides of a three-dimensional memory array 200.

The memory array 200, in various embodiments, is addressable by word lines via row decoders 240A/240B and by bit lines via column decoders 242A/242B. In some embodiments, a device controller 126 external to the memory die 212 is included in the same memory device 210 (e.g., a removable storage card or package) as the one or more memory die 212. Commands and data are transferred between the host and the device controller 126 via lines 232 and between the device controller 126 and the one or more memory die 212 via lines 234. One implementation can include multiple chips 212.

On-die controller 220, in one embodiment, cooperates with the read/write circuits 230A/230B to perform memory operations on the memory array 200. The on-die controller 220, in certain embodiments, includes a state machine 222, an on-chip address decoder 224, a power control circuit 226, and a memory allocation component 150, which may be substantially as described above with regard to FIG. 1. In various embodiments, a memory allocation component 150 may include or be embodied by an on-die controller 220, a state machine 222, a device controller 126, and/or a device driver.

The state machine 222, in one embodiment, provides chip-level control of memory operations. The on-chip address decoder 224 provides an address interface to convert between the address that is used by the host or a device controller 126 to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that can create voltages larger than the supply voltage.

In one embodiment, one or any combination of on-die controller 220, power control circuit 226, on-chip address decoder 224, state machine 222, memory allocation component 150, decoder circuit 242A, decoder circuit 242B, decoder circuit 240A, decoder circuit 240B, read/write circuits 230A, read/write circuits 230B, and/or device controller 126 can be referred to as one or more managing circuits.

Figure 3:
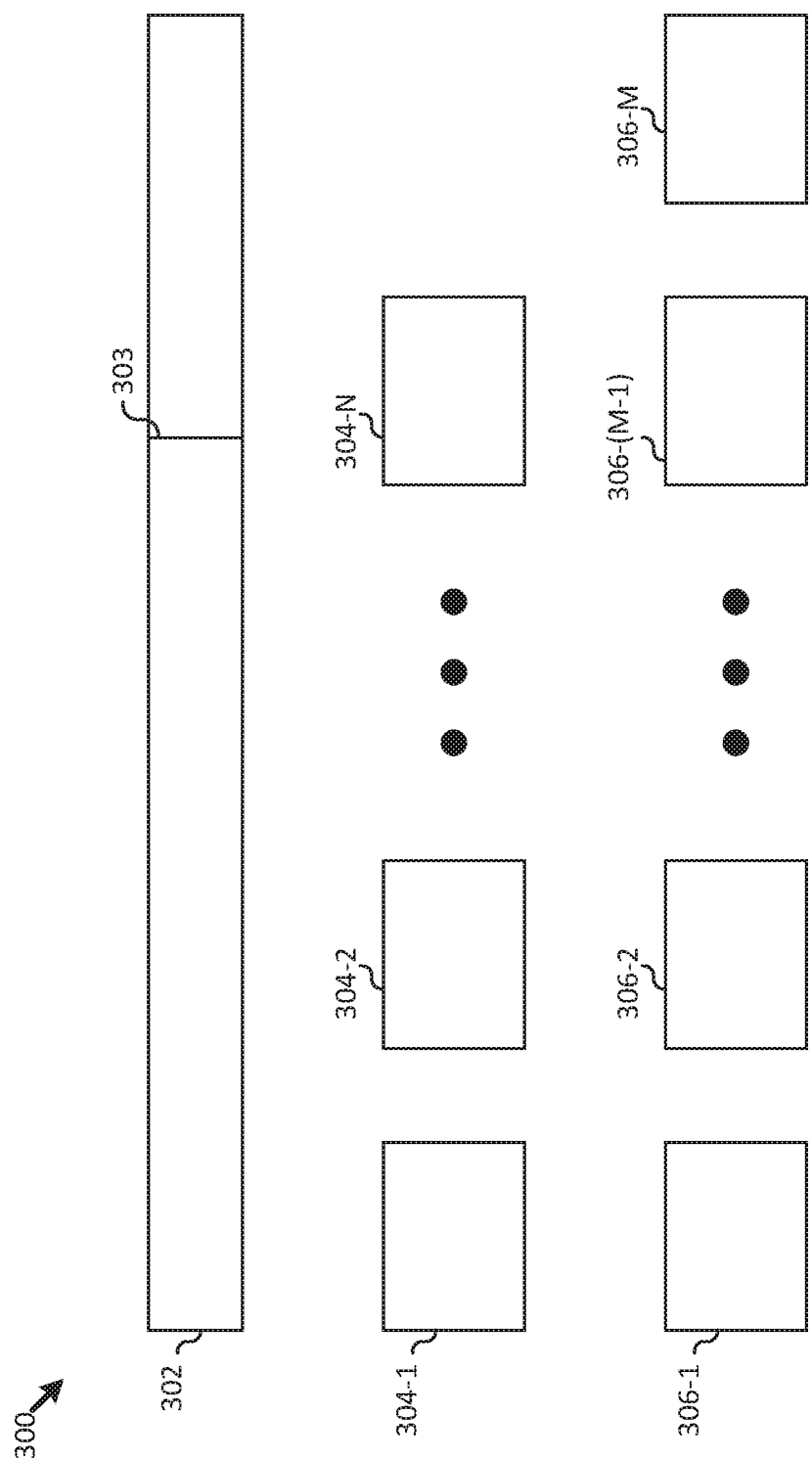
FIG. 3 is a block diagram illustrating multiple data structures for storing data in an array of non-volatile memory cells.

FIG. 3 is a block diagram of multiple data structures that are used to manage the storing of data on one or more storage regions. For example, FIG. 3 illustrates a metadata change structure 302 and a metadata structure 304, where the metadata change structure 302 is a data structure that stores changes to be made to the metadata structure 304 and the metadata structure stores metadata or information about storage regions on a memory device. As described herein, a storage region may include a die, a block, a page, a cell, or other subdivision of a memory device. In certain embodiments, the metadata structure 304 may be significantly large such that it is separated into different parts or shards.

As illustrated, the metadata structure 304 may be separated into multiple parts 304-1 to 304-N or shards. Certain memory devices may have RAM limitations such that the RAM is unable to store the multiple parts 304-1 to 304-N in the RAM at one time. Accordingly, when reading or updating the metadata structure 304, a part of the table, such as part 304-1, may be read into a RAM from non-volatile memory. While in the RAM, the controller may perform memory operations on the part 304-1. When the memory operations are completed the part 304-1 may be reprogrammed into the non-volatile memory.

In certain exemplary embodiments, the metadata structure 304 may store information related to logical representations of PBAs. Accordingly, the controller may maintain a metadata structure 304 that maps LBAs to PBAs, or the like. In one example, the controller may maintain a metadata structure 304 as a global address table (GAT). Alternatively, in other embodiments, instead of comprising a GAT, the metadata structure 304 may comprise another data structure (e.g., a lookup table, an array, a forward map, a logical-to-physical mapping structure, or the like) that is keyed to and/or indexed by LBA. In particular, a GAT may be a table, where the keys to the table are LBAs and the value stored with each LBA is a PBA pointer. Accordingly, the controller for a memory device may find a particular PBA in the GAT by looking up the corresponding LBA. Conversely, a controller may maintain a metadata structure 304 as an inverse global address table (iGAT). Like the GAT, an iGAT may be a table, where the keys to the table are PBAs and the value stored with a PBA is an LBA pointer. Accordingly, the controller for a memory device may find a particular LBA in the iGAT by looking up the corresponding PBA. In alternative embodiments, a memory device may be unable to store a full iGAT. Accordingly, an iGAT may be an iGAT bitmap, where the key is a PBA and the value associated with each key may be a single bit that indicates whether or not a corresponding GAT has a LBA pointer associated with that particular PBA. The combination of the PBA and LBA mapping provided by the GAT and the iGAT may be useful in performing certain operations that may include housekeeping operations such as relocation or defragmentation, security operations such as secure erases, and the like.

In certain embodiments, the storage of the PBA to LBA mapping in the GAT and the iGAT may consume a significant number of storage regions as both tables may be bigger than a memory minimal programming unit. For example, metadata structure 304 may represent either a GAT or an iGAT. As illustrated, the metadata structure 304 may be separated into multiple parts 304-1 to 304-N or shards. As parts 304-1 to 304-N may be updated separately from one another, maintaining coherency between two related tables, such as the GAT and the iGAT, may be complex.

In at least one embodiment, a controller may track changes to be made to a metadata structure 304 in a metadata change structure 302. For example, to maintain coherency between a GAT and an iGAT, a controller may maintain an iGAT validity queue. As described herein, an iGAT validity queue may refer to a metadata change structure, such as metadata change structure 302, that aggregates changes to be made to a metadata structure 304, such as an iGAT. For the example of an iGAT, the metadata change structure 302 may be a data structure configured to store information describing changes to a mapping between an allocated physical block address and an associated logical block address. As additional physical blocks are allocated, the PBAs of the allocated physical blocks may be aggregated in the iGAT validity queue until the size of the queue meets or exceeds a flush point 303. When the size of the iGAT validity queue reaches or exceeds a flush point 303, the PBAs and pointers to the associated LBAs may be flushed from the iGAT validity queue and stored in the iGAT. Alternatively, the aggregated PBAs and pointers to the associated LBAs may be periodically flushed from the iGAT when the size of the iGAT validity queue is less than the flush point.

In certain embodiments, a controller may maintain a group of free storage regions 306. The free storage regions 306 may be referred to as a free memory group, where a free memory group may be a group of storage regions that are not presently allocated for storing data. As illustrated in FIG. 3, a controller may allocate the storage regions 306-1 to 306-M for storing data. In particular, when data is to be saved on a storage region 306, a controller may identify a storage region in the free memory group, such as block 306-1, and allocate the storage region for storing data. The physical address of the storage region may then be saved in the metadata change structure 302 along with the logical address associated with the storage region.

In certain embodiments, a controller may select a free storage region from the free memory group 306 based on characteristics of the free storage regions in the free memory group. For example, a controller may select a free storage region based on the program/erase cycle (PEC) values of the different storage regions in the free memory group 306. A controller may select a storage region having a smaller PEC value to provide wear leveling. A controller may select a free storage region based on other characteristics of the storage regions. In certain embodiments, where the controller selects a free storage region based on a smaller PEC value, random writes to the metadata change structure 302 may cause the metadata change structure 302 to be filled past the flush point 303 more frequently, causing changes stored in the metadata change structure 302 to be flushed to the associated part of the metadata structure 304. Too frequent flushing of the metadata change structure 302 may cause the performance of a system to degrade significantly. For example, with regards to an iGAT validity queue, as free storage regions are allocated, a storage region may be loaded from a non-volatile memory to a cache. Typically, a cache may be full, accordingly, when a free storage region is allocated, data on a storage region previously allocated to the cache may be deallocated. For example, the least recently used storage region in a memory cache may be deallocated. Further, as an iGAT may be divided into multiple parts, such as parts 304-1 through 304-N, an increased amount of distinct storage regions described in the metadata change structure 302, may cause an increased number of parts 304-1 through 304-N being updated when the metadata change structure 302 is flushed as the number of changed storage regions exceeds the flush point 303. As storage regions may be frequently allocated to a memory cache and/or the iGAT validity queue may be frequently flushed to multiple parts 304-1 through 304-N of the metadata structure 304, the allocation of free storage regions may cause operational bottlenecks.

In certain embodiments, to reduce the effects of too frequent flushing of data from a metadata change structure 302 to multiple parts 304-1 through 304-N of the metadata structure 304, storage regions that have been previously allocated or are presently allocated, described in the metadata change structure 302, may be reallocated, instead of allocating free storage regions from a free memory group. As used herein, a previously allocated or presently allocated storage region may refer to a storage region that is currently described in the metadata change structure 302. For example, when the metadata change structure 302 is an iGAT validity queue, storage regions that have previously been allocated, that are described in the iGAT validity queue, may be reallocated before storage regions in the free memory group are allocated. In certain embodiments, a controller may determine whether the metadata change structure 302 describes storage regions that may be reallocated. In at least one embodiment, to determine whether or not previously allocated storage regions may be reallocated, the controller may perform an availability check. As described herein, an availability check is a process performed by a controller that determines whether or not allocated storage regions, described in the metadata change structure 302, may be reused or reallocated. Further, where the availability check determines that a storage region may not store valid data, the availability check may determine whether a storage region is erasable. When a storage region is erasable, the storage region may be erased without a loss of valid data. For example, the availability check may identify certain parameters describing the different storage regions that are currently described in the metadata change structure 302 and compare the identified parameters against different thresholds to determine whether an allocated storage region may be reallocated. In at least one embodiment, identified parameters may include how often a storage region has been reallocated, the amount of valid data in the storage region, how recently the storage region was allocated, and the like. As used herein, valid data may refer to data that has been written to a storage region and has not been modified.

In at least one embodiment, in determining whether or not a storage region may be reallocated, the availability check, performed by the controller, may identify the amount of valid data stored in the storage region. In certain embodiments, a controller may determine that a storage region may be reallocated when there is no valid data stored on the storage region. Accordingly, the controller may identify the storage regions described in the metadata change structure 302 that do not store valid data. Alternatively, the availability check may define a valid data threshold, where the valid data threshold identifies a threshold amount of valid data that may be stored in a storage region for a storage region to be reallocated. For example, if a storage region stores an amount of valid data that is less than the valid data threshold, the controller may identify the storage region as a storage region that may be reallocated. When the controller identifies a storage region that has an amount of valid data that is less than the valid data threshold, the controller may relocate the valid data in the storage region to another storage region within the metadata change structure 302 and indicate that the reusable storage region has no valid data. In certain embodiments, to facilitate determining whether the storage region currently stores valid data or the amount of valid data stored in the storage region, the controller may store a validity counter that counts the number of valid memory units written to the storage region. For example, when a memory unit is written to the storage region the controller may increment the validity counter and when a previously written memory unit becomes invalid, the controller may decrement the validity counter.

In a further embodiment, in determining whether a storage region may be reallocated, the availability check performed by the controller may identify the number of times that a storage region has been previously reallocated. In certain embodiments, the availability check maintains a reuse counter that is incremented when a storage region, described in the metadata change structure 302, is reallocated. For example, when a storage region is allocated from the free memory group 306, the controller may initialize the reuse counter to zero. If the controller determines that the storage region is to be reallocated, the controller may increment the reuse counter with subsequent reallocations. In at least one embodiment before reallocating the storage region, the controller may compare the reuse counter for a storage region to a reallocation threshold. If the reuse counter exceeds the reallocation threshold, the controller may determine that the storage region may not be reallocated. Tracking the number of times that a storage region is reused aids in providing wear leveling for the storage regions on the memory device. For example, if the storage regions that have been previously allocated are repeatedly reallocated, the storage regions described in the metadata change structure 302 may wear out while the storage regions in the free memory group 306 remain unused. Accordingly implementing a reuse counter aids in providing wear leveling as a storage region having a reuse counter that exceeds the reallocation threshold may be returned to the free memory group in exchange for a free storage region in the free memory group.

In a further embodiment, a controller performing the availability check may identify two storage regions described in the metadata change structure 302 that may be reallocated. For example, the availability check may identify two storage regions that have amounts of valid data less than the valid data threshold and reuse counters below the reallocation threshold. To determine which of the storage regions to reallocate, the controller may further compare parameters for the storage regions against one another. For example, the controller may compare the validity counters for the storage regions. If one storage region has a validity counter equal to zero and another storage region has a validity counter greater than zero but less than the valid count threshold, the controller may select the storage region having the validity counter equal to zero, in part because the storage region having the validity count equal to zero would not store valid data to be relocated by the controller to other storage regions. If both storage regions have validity counters greater than zero but less than the valid count threshold, the controller may select the storage region having the smaller of the two validity counters. In certain embodiments, where both storage regions have validity counters equal to zero, the controller may select the storage region having the smaller of the two reuse counters to provide wear leveling for the previously allocated storage regions. In an additional embodiment, where different storage regions have equal reuse counts and equal validity counts, the controller may select a storage region that was the least recently allocated. Alternatively, when two or more storage regions may be reallocated, the controller may select the least recently used allocated storage region without comparing the validity counts and the reuse counts for the two or more storage regions.

In at least one embodiment, when the controller determines that there are no available storage regions for reallocation described in the metadata change structure 302. The controller may select a free storage region from the free memory group 306 for allocation. When a free storage region is allocated, a storage region described in the metadata change structure 302 may be deallocated back to the free memory group 306. In certain embodiments, the controller selects the storage region described in the metadata change structure 302 that was least recently allocated for deallocation to the free memory group 306. The controller may then select a free storage region in the free memory group 306 that has a smallest PEC value for allocation. By implementing the above described validity check the controller may reduce the amount of allocations of free storage regions. In certain embodiments, such as implementations like the iGAT validity queue, the reduction of allocations of free storage regions to the metadata change structure 302 may reduce the number of times that data in the metadata change structure 302 may be flushed to different parts 304-1 through 304-N of the metadata structure 304 and also reduces the allocations of free storage regions to a memory cache, thus, improving the performance of memory devices.

Figure 4:
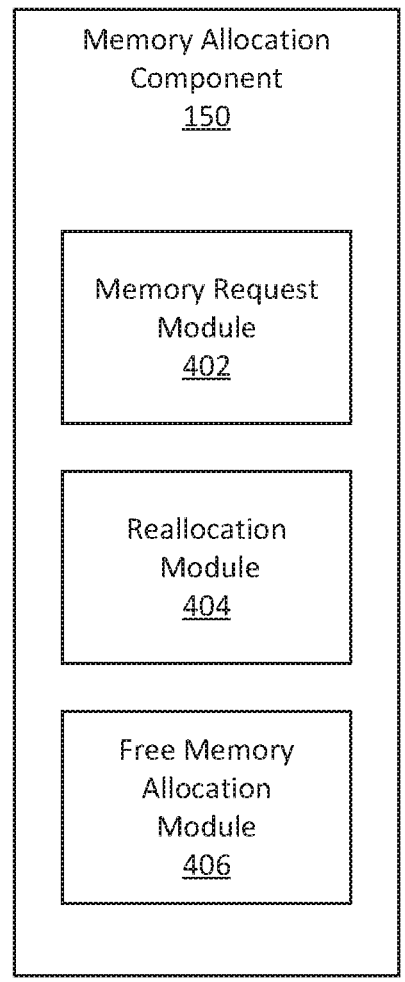
FIG. 4 is a schematic block diagram illustrating one embodiment of a memory allocation component.

FIG. 4 depicts one embodiment of a memory allocation component 150. Memory allocation component 150 may be substantially similar to the memory allocation component 150 described above with regards to FIGS. 1-3. In general, as described above, the memory allocation component 150 may be configured to allocate storage regions for storing data. In certain embodiments, when storage regions are allocated, a physical address for the storage region may be mapped to a logical address. Information regarding the storage region may be stored in a metadata structure. A metadata structure, as used herein, may refer to an organization of data stored on a memory device that stores metadata describing one or more storage regions. The metadata structure may store the information in an array, a linked list, a record, a union, a class, a tree, a table, and the like. When the memory allocation component 150 allocates a storage region, the storage region allocated by the memory allocation component 150 may be a block, a page, a memory stripe, a die, or other grouping of memory cells. Further, the allocated storage region may be a physical group of memory cells or a logical grouping of memory. In certain embodiments, the memory allocation component 150 may allocate storage regions in response to a memory request. As used herein, a memory request may refer to a request to store data in a storage region. For example, when a controller attempts to write data, the memory allocation component 150 may allocate memory for storing the data. In the depicted embodiment, the memory allocation component 150 includes a memory request module 402, a reallocation module 404, and a free memory allocation module 406. In various embodiments, a controller, such as an on-die controller 220 for a single non-volatile memory element 123, a device controller 220 for a device comprising one or more non-volatile memory elements 123, a device driver comprising executable code stored on a computer-readable storage medium, or the like, may include the memory request module 402, the reallocation module 404, and the free memory allocation module 406.

The memory request module 402, in one embodiment, is configured to handle memory requests. For example, the memory request module 402 may be configured to identify a request to allocate further memory for storing additional data. For example, one or more storage regions may be allocated. A controller may attempt to write data, however, there may be insufficient memory allocated for storing the data or the memory allocated may be unable to store the data. Accordingly, the memory request module 402 may request additional storage regions to be allocated for the storing of the data.

In certain embodiments, where the controller maintains an iGAT validity queue, the iGAT validity queue may store information describing changes to be made to an associated iGAT. When changes are to be made to the iGAT, the changes may be stored in an iGAT validity queue until the iGAT validity queue is sufficiently full. For example, when a GAT is changed, the changes to the GAT may be stored in the iGAT validity queue associated with the iGAT part that corresponds with the physical memory address. When the iGAT validity queue becomes sufficiently full, the data stored in the iGAT validity queue may be flushed from the iGAT validity queue into the iGAT. In at least one embodiment, when changes to be made to the iGAT are stored in the iGAT validity queue, the memory request module 402 may request that changes in memory allocation be reflected in the iGAT validity queue.

The reallocation module 404, in one embodiment, is configured to reallocate storage regions described in the metadata change structure in response to a memory request by the memory request module 402. In certain embodiments, when the memory request module 402 requests that additional storage regions be allocated, the reallocation module 404 may perform an availability check to determine if previously allocated memory is reusable. As described herein, a storage region may be reusable when a previously allocated storage region satisfies one or more thresholds. For example, the one or more thresholds may include a validity threshold and a reallocation threshold.

In at least one embodiment, a storage region may satisfy a valid data threshold when the amount of data stored in the storage region is less than an amount of data specified by the valid data threshold. In certain embodiments, the valid data threshold may specify that a storage region may be reusable when there is no valid data stored on the storage region. When the valid data threshold specifies that no valid data may be stored on the storage region, the reallocation module 404 may erase invalid data stored on the storage region that is reusable and then reallocate the storage region. In an alternative embodiment, the valid data threshold may specify an amount of valid data that may be stored in the storage region. When the valid data threshold specifies an amount of valid data, and a storage region satisfies the valid data threshold, the reallocation module 404 may relocate the valid data on the storage region to another storage region, erase the data on the storage region, and reallocate the storage region. Accordingly, the performance of systems may improve due to the reuse of previously allocated storage regions.

In a further embodiment, a storage region may satisfy a reallocation threshold when the number of times that a particular storage region has been reallocated is less than a specified reallocation threshold. For example, the reallocation module 404 may store a reuse counter for the separate storage regions that have been allocated. The reallocation module 404 may compare the reuse counter against a reallocation threshold. If the reuse counter associated with the storage region is less than the reallocation threshold, the reallocation module 404 may increment the reuse counter and reallocate the storage region. In certain embodiments, the reallocation module 404 may reallocate a storage region when the reuse counter is less than the reallocation threshold and the amount of valid data stored in the storage region is less than the valid data threshold. In certain implementations, when the storage region satisfies a valid data threshold but the reuse counter is greater than the reallocation threshold, the reallocation module 404 may release the allocated storage region to a free memory group. The reallocation module 404 may compare a reuse counter against a reallocation threshold to reduce the effects of repeatedly reallocating a storage region. In particular, the comparison of a reuse counter against a reallocation threshold may aid in the performance of wear leveling and other related tasks.

In certain embodiments, the reallocation module 404 may identify more than one storage region that is reusable. When the reallocation module 404 identifies more than one reusable storage region, the reallocation module 404 may select the storage region that is the least recently used. For example, when the data structure is an iGAT validity queue, separate data blocks may be allocated to the iGAT validity queue. When two of the data blocks are identified as reusable, the reallocation module 404 may select the data block that is the least recently used data block for reallocation. Accordingly, in certain embodiments, the reallocation module 404 may maintain a record indicating the time of the most recent allocation for a particular data block allocated to the iGAT validity queue. In an alternative embodiment, where the valid data threshold allows a storage region having an amount of valid data to be reused, the reallocation module 404 may select a storage region having the least amount of valid data for reallocation. For example, the reallocation module 404 may identify two separate data blocks allocated described in the data structure that contain amounts of data less than a valid data threshold. In certain embodiments, one of the two data blocks may have valid data stored therein while no valid data may be stored on the other data block. The reallocation module 404 may select the data block having no valid data or the data block having the least amount of valid data stored thereon as compared to the data block having valid data stored therein because the data block having valid data stored thereon may use more time to reallocate as the reallocation module 404 may relocate the valid data to another data block.

The free memory allocation module 406, in one embodiment, is configured to allocate portions of free memory associated with the memory request. For example, when the reallocation module 404 is unable to identify a reusable storage region or a reuse count for a reusable storage region in the metadata change structure exceeds a reallocation threshold, the free memory allocation module 406 may allocate a free storage region from a free memory group. In certain embodiments, the free memory allocation module 406 may select a storage region from the free memory group as directed according to a wear leveling algorithm. For example, the free memory allocation module 406 may track program/erase counts for each storage region in a memory array. As used herein, a program/erase count is a number indicating the number of times that a storage region has been programmed and/or erased. When the free memory allocation module 406 allocates a free storage region, the free memory allocation module 406 may select the free storage region having the smallest program/erase count.

In certain embodiments, where the metadata change structure is an iGAT validity queue, the reallocation module 404 may attempt to reallocate storage regions, such as data blocks, described in the iGAT validity queue. However, when the separate storage regions described in the iGAT validity queue store sufficient amounts of valid data or a storage region having little to no valid data has been reallocated a sufficient number of times such that a reuse counter associated with the storage region exceeds a reallocation threshold, the free memory allocation module 406 may allocate a free storage region from a free memory group. In particular, a free memory allocation module 406 may allocate a free storage region having the lowest program/erase count in the free memory group. Accordingly, by allocating memory from the free memory group when there are no reusable portions of memory described in an iGAT validity queue, the amount of allocations from the free memory group may be reduced. As allocations from a free memory group may take more time than reallocating storage regions described in the iGAT validity queue, performance of a memory device associated with the iGAT validity queue and the free memory group may improve.

Figure 5:
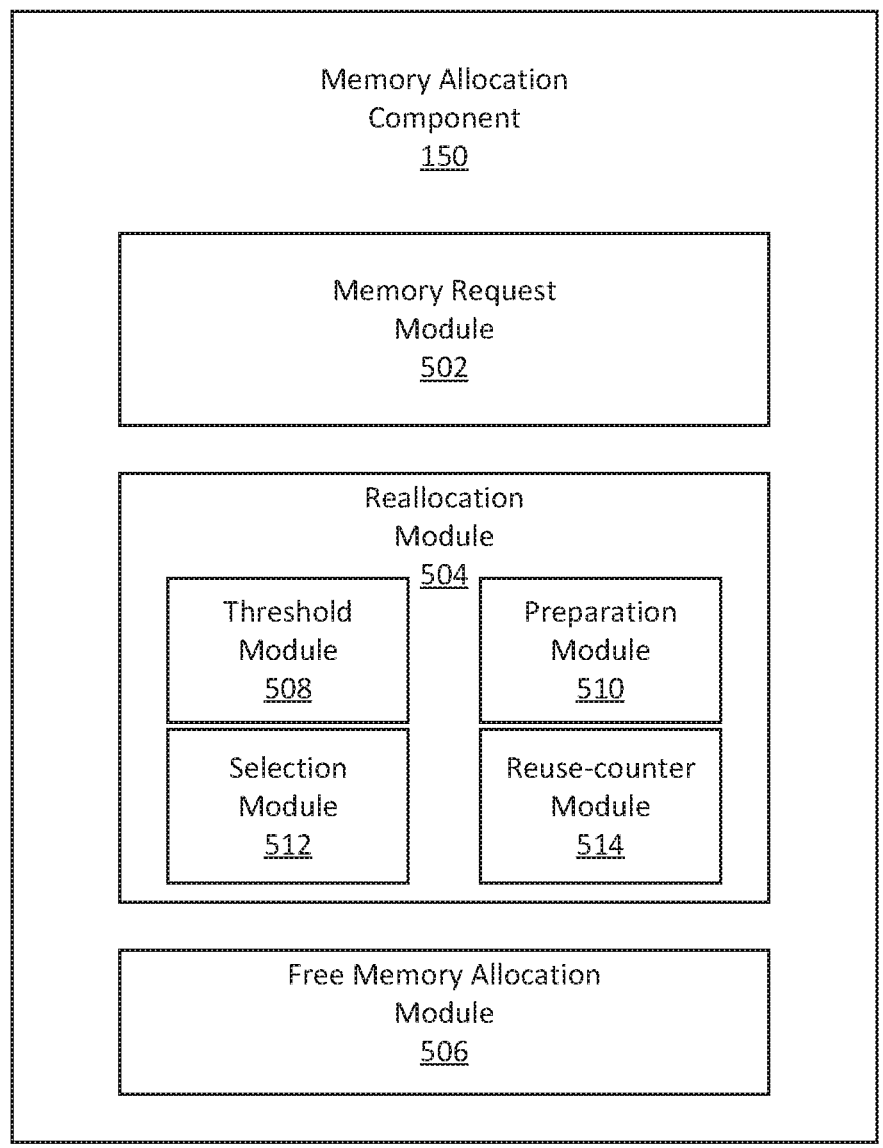
FIG. 5 is a schematic block diagram illustrating another embodiment of a memory allocation component.

FIG. 5 depicts another embodiment of a memory allocation component 150. The memory allocation component 150, in various embodiments, may be substantially similar to the memory allocation component 150 described above with regards to FIGS. 1-4. In the depicted embodiment, the memory allocation component 150 includes a memory request module 502, a reallocation module 504, and a free memory allocation module 506, which may be configured substantially as described above with regards to the memory request module 402, the reallocation module 404, and the free memory allocation module 406 described above with respect to FIG. 4. The reallocation module 504, in the depicted embodiment, further includes a threshold module 508, a preparation module 510, a selection module 512, and a reuse-counter module 514.

The threshold module 508, in one embodiment, is configured to determine whether allocated storage regions described in a metadata structure satisfy one or more thresholds. For example, the threshold module 508 may determine an amount of valid data in a storage region. To determine an amount of valid data in a storage region, the threshold module 508 may maintain a separate valid data counter for the separate storage regions. The valid data counter, in at least one embodiment, may be a binary indicator that indicates whether or not valid data is stored on the storage region. Alternatively, the valid data counter may be a counter that is incremented by the threshold module 508 when a memory cell has valid data written to it. Also, the valid data counter may be decremented by the threshold module 508 when a memory cell has data stored therein marked as invalid. Accordingly, the valid data counter may indicate the amount of valid data stored on a storage region.

As described above, the threshold module 508 may also describe a valid data threshold. As used herein a valid data threshold indicates an amount of data where storage region storing less than the amount of data indicated by the valid data threshold may be reusable and reallocated to storing other data. As such, the threshold module 508 compares a valid data counter against the valid data threshold to determine if the storage region associated with the valid data counter is reusable. When the valid data counter for a storage region is less than the valid data threshold, the threshold module 508 may indicate that the storage region is potentially reusable.

The reuse counter module 514, in one embodiment, is configured to determine whether an allocated storage region has been previously allocated a substantial number of times such that the reuse counter module 514 should release the storage region to a free memory group. To determine whether or not a storage region should be released to a free memory group, that a reuse counter module 514 maintains a reuse counter. In certain embodiments, to maintain a reuse counter the reuse counter module 514 may initialize the reuse counter when a storage region is initially allocated. Upon each subsequence reallocation, the reuse counter module 514 may increment the reuse counter. When it is determined that a storage region may be potentially reusable, the reuse counter module 514 may compare the reuse counter against a reallocation threshold. If the reuse counter is less than the reallocation threshold, then the storage region may still be potentially reusable. Conversely if the reuse counter exceeds the reallocation threshold, then the reuse counter module 514 indicates that the storage region has been previously reallocated a substantial number of times such that it should be released to the free memory group.

The selection module 512, in one embodiment, is configured to determine, based on whether a storage region is potentially reusable as indicated by the threshold module 508 and the reuse counter module 514, which storage region should be reallocated. In certain embodiments, the threshold module 508 and the reuse counter module 514 may identify more than one potentially reusable storage region. In the event, that there is more than one potentially reusable storage region, the selection module 512 may determine which of the multiple storage regions should be reallocated. For example, the selection module 512 may determine which storage region to reallocate based on which of the storage regions was least recently reallocated. Also, the selection module 512 may determine which storage region to reallocate based on which of the storage regions was least recently used.

In certain embodiments, where the valid data threshold allows a storage region to have some valid data stored thereon and the threshold module 508 identifies two or more storage regions that satisfy the valid data threshold. The selection module 512 may select the storage region having the least amount of valid data stored thereon. Also, the selection module 512 may determine which of the storage regions to reallocate based on the comparison of the associated reuse counters for the storage regions. In particular, the selection module 512 may select the storage region having the smaller of the two reuse counters. Based on the different tests performed by the threshold module 508 and the reuse counter module 514 in conjunction with a comparison of how recently a storage region has been used and/or reallocated, the selection module 512 may identify which storage region of multiple storage regions should be reallocated.

The preparation module 510, in one embodiment, is configured to prepare a storage region for reallocation. For example, when the storage region that was selected for reallocation still has valid data stored thereon, the preparation module 510 may relocate the valid data to another storage region and mark the data stored on the storage region as invalid. Further, the preparation module 510 may erase the storage region before reallocating the storage region so that the storage region may be reprogrammed. In certain embodiments, when the threshold module 508 and the reuse counter module 514 determine that there are no potentially reusable storage regions, the preparation module 510 may select the least recently used storage region identified in a metadata structure for releasing to the free memory group. In at least one embodiment, the preparation module 510 may erase the data stored on the storage region to be released the free memory group before releasing the storage region to the free memory group. Accordingly, reallocated storage regions and released storage regions in the free memory group may be prepared for being reprogrammed with other data.

Figure 6:
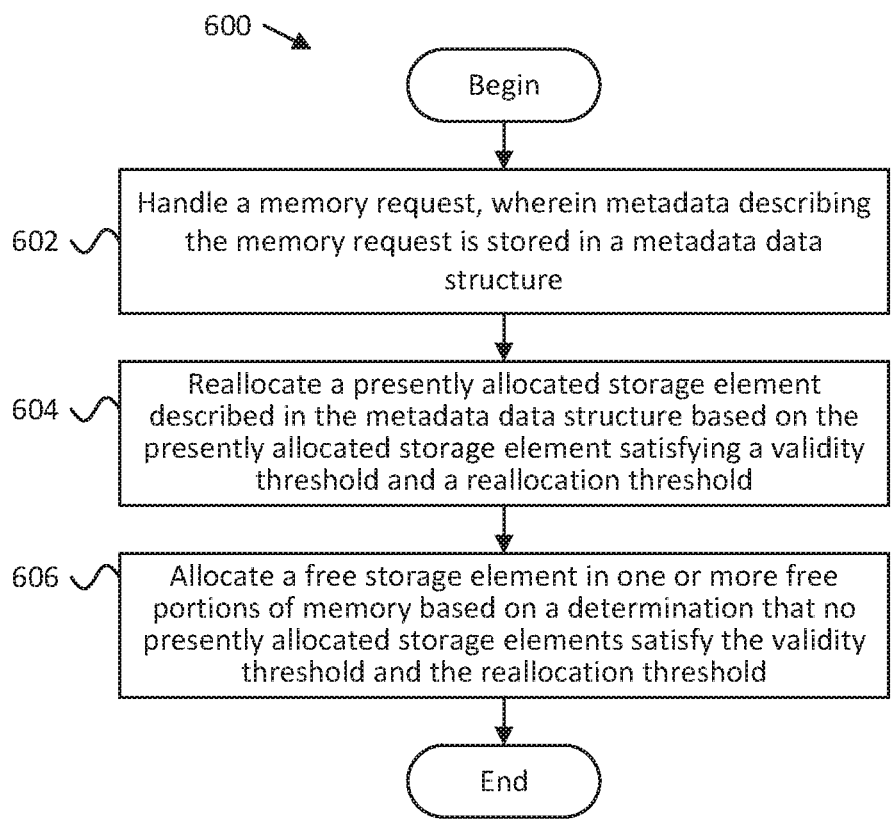
FIG. 6 is a schematic flow chart diagram illustrating one embodiment of a method for block reuse for memory operations for non-volatile memory.

FIG. 6 depicts one embodiment of a method 600 for block reuse for memory operations. The method 600 begins, and the memory request module 402 handles 602 a plurality of memory requests. For example, as used herein, handling a memory request may refer to a request handled by a controller, where the request asks that storage regions be allocated for the storing of data. In certain implementations, information relating to storage region changes may be buffered in a metadata change structure, where the storage region changes may be flushed from the metadata change structure and stored in a metadata structure when the metadata change structure is sufficiently full.

In certain embodiments, the reallocation module 404 may determine at 604, whether a presently allocated storage region satisfies a validity threshold and a reallocation threshold. When the presently allocated storage region satisfies the validity threshold and the reallocation threshold, the reallocation module 404 may reallocate 606 the presently allocated storage region. For example, in response to a first memory request in the plurality of memory requests, the controller may reallocate a presently allocated storage region identified in the metadata change structure to the based on the presently allocated storage region satisfying the validity threshold and the reallocation threshold. When the presently allocated storage region fails to satisfy the validity threshold and the reallocation threshold, the free memory allocation module 406 allocates 606 a free storage region, and the method 600 ends. For example, in response to a second memory request in the plurality of memory requests, the controller may allocate a free storage region based on there being no presently allocated storage region that satisfy the validity threshold and the reallocation threshold.

Figure 7:
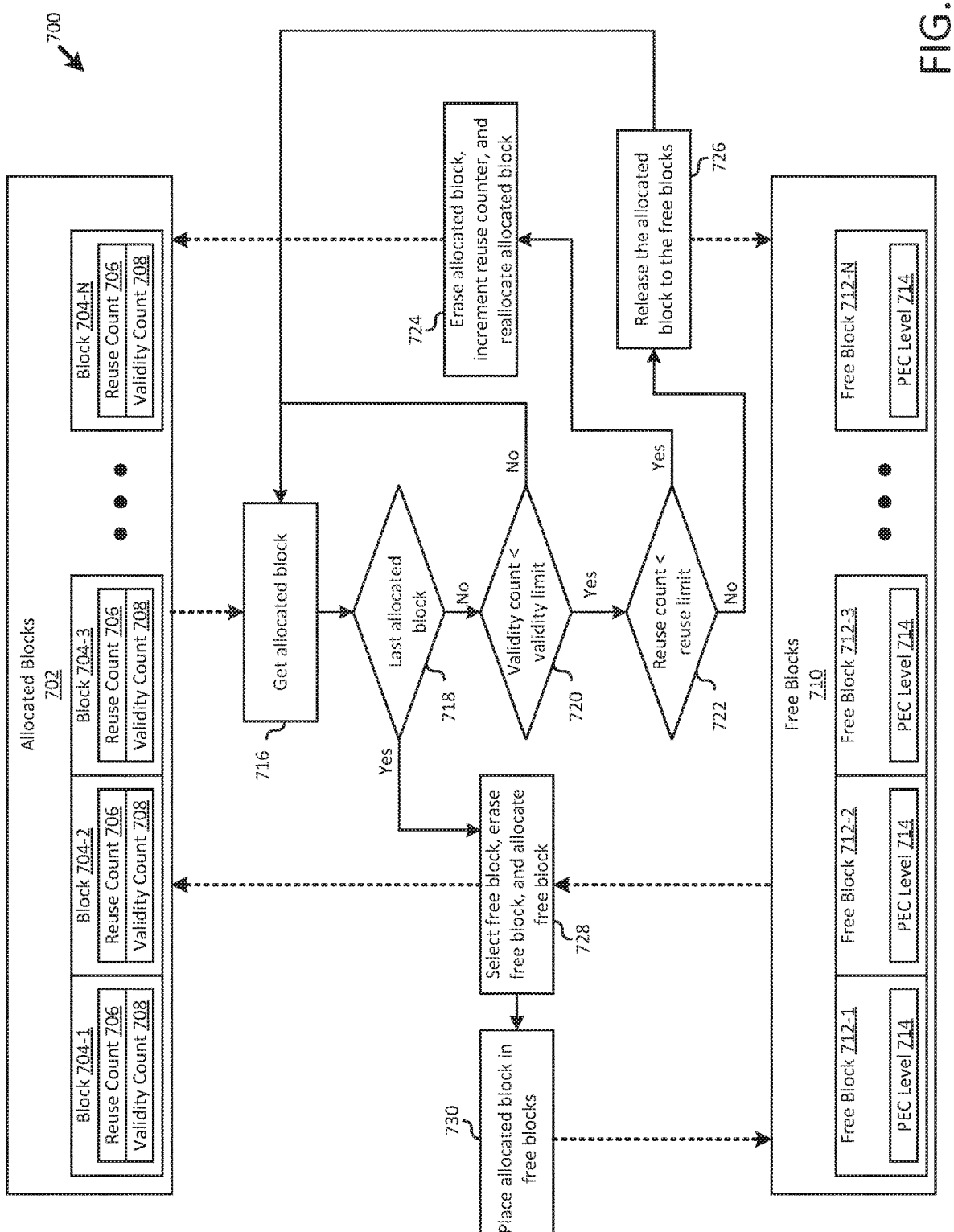
FIG. 7 is a schematic flow chart diagram illustrating another embodiment of a method for block reuse for memory operations for non-volatile memory.

FIG. 7 is a flow diagram of a method 700 for allocating blocks to an allocated block group 702. As used herein in connection with FIG. 7, a block corresponds to a storage region as described above in relation to FIGS. 1-6. As illustrated in method 700, a controller may maintain two separate block groups. In a first block group, allocated blocks 702, a controller may maintain a record of blocks that have been previously allocated for storing data. In at least one embodiment, the allocated blocks 702 may be an iGAT validity queue. When the allocated block 702 is an iGAT validity queue, the controller may store information describing changes to an iGAT. In certain embodiments, this information may include data describing memory blocks that have been allocated for storing data since the last time the iGAT was updated. For example, data describing the memory blocks may include a physical block address and a corresponding logical address. This data may correspond with updates made to a GAT. As part of storing data in the allocated blocks 702, the controller may also store information describing how many times a block in the allocated blocks 702 has been reallocated and a counter indicating the amount of valid stored on a particular block. In at least one embodiment, the information describing how many times a block has been reused may be stored as a reuse count 706. Also, the information describing the amount of valid data stored on a particular block may be stored as a validity count 708.

In certain embodiments, the controller may maintain a record of free blocks 710. The free blocks 710 is similar to the free memory group as described above with regards to FIGS. 1-6. Further, the free blocks 710 is a record of free blocks 712-1 through 712-N that have not been allocated for storing data. In certain embodiments, a controller may maintain a record of how many times a free block 712 has been used. For example, the controller may maintain a program/erase count level 714 for each block 712 in the free blocks 710 that indicates how many times a particular block 712 has been programmed/erased.

In certain embodiments, method 700 begins at 716, where a controller gets an allocated block 704 from the allocated blocks 702. In certain embodiments, the controller acquires the least recently used block in the allocated blocks 702. If the controller has already acquired the least recently used block, the controller may progressively step through the allocated block 702 and till it either acquires a block 704 that is reallocated or determines that there are no allocated blocks in the allocated blocks 702. After the controller has acquired an allocated block 704 from the allocated blocks 702, the controller determines at 718 if there are no more allocated blocks available. If the controller determines that there are no more allocated blocks available, the method 700 proceeds at 728, where a free block is selected, erased, and allocated to the allocated free block 702. For example, the controller may select a free block 712 having the smallest PEC level 714. Alternatively, the controller may select a free block 712 based on how recently the block has been allocated. When the controller selects a free block 712 the free blocks 710, the controller may erase data that exists on the free block 712 and allocate the free block 712 to the allocated blocks 702. Further, the method 700 may proceed at 730, where the acquired allocated block 704 may be released to the free blocks 710. In certain embodiments, when an allocated block 704 is released to the free blocks 710, pointers pointing to addresses on the allocated block 704 may be erased. Further, data stored on the allocated block 704 may also be erased.

In at least one embodiment, where the method 700 determines at 718 that the acquired block 704 is not the last allocated block, the method 700 may proceed at 720, where a validity count 708 is compared against a validity limit. As described herein a validity limit may be equivalent to the validity threshold described above in connection with FIGS. 1 through 6. As described above, the validity count is equivalent to the amount of valid data stored on the acquired allocated block 704. In certain embodiments, the validity limit may indicate that allocated blocks having no data are reusable. Alternatively, the validity limit may indicate that allocated blocks having an amount of data less than an amount specified by the validity limit may be reusable. If the validity count for the acquired allocated block 704 exceeds the validity limit, the method 700 returns to 716 where another block may be acquired. However, if the validity count is less than the validity limit, the method 700 may proceed at 722, where a reuse count is compared against a reuse limit. As described herein, the reuse limit may be equivalent to the reallocation threshold described above in connection with FIGS. 1 through 6. As described above in connection with the reallocation threshold, a reuse limit may indicate the number of reallocations that may be performed for a particular block before the allocated block 704 is released to the free blocks 710. For example, when the reuse count exceeds the reuse limit, the method 700 may proceed to 726 where the allocated block 704 may be released to the free blocks 710. Upon releasing the allocated block 704 to the free blocks 710, the method 700 may return to 716 where another allocated block 704 may be acquired from the allocated blocks 702.

In certain embodiments, when the reuse count is less than the reuse limit, the method 700 may proceed at 724 where an allocated block may be erased, the reuse counter incremented, and reallocated. For example, when the acquired block 704 does not have valid data stored thereon, the acquired block 704 may be erased, the reuse counter incremented, and reallocated to the allocated blocks 702. Conversely, when the acquired block 704 has valid data stored thereon, the valid data stored on the acquired block 7 4 may be relocated to another block in the allocated blocks 702, and then data stored on the acquired block 704 may be erased. The method 700 ends until another block is acquired to store data thereon.

In various embodiments, a means for comparing an amount of data stored on a previously allocated storage region against a validity threshold may include a preparation module 610, a selection module 612, a reallocation module 404, a memory allocation component 150, a state machine 222, an on-die controller 220, a device controller 126, a device driver, other logic hardware and/or other executable code stored on a computer readable storage medium. Other embodiments may include similar or equivalent means for comparing an amount of data stored on a previously allocated storage region against a validity threshold.

In various embodiments, means for wear leveling for the previously allocated storage region based on a reuse counter associated with the previously allocated storage region being less than a reallocation threshold may include a reuse-counter module 514, a reallocation module 406, a memory allocation component 150, a state machine 222, an on-die controller 220, a device controller 126, a device driver, other logic hardware and/or other executable code stored on a computer readable storage medium. Other embodiments may include similar or equivalent means for wear leveling for the previously allocated storage region based on a reuse counter associated with the previously allocated storage region being less than a reallocation threshold.

In various embodiments, means for reallocating the presently allocated storage region based on the comparison of the presently allocated storage region against the validity threshold and the reallocation threshold may include a threshold module 508, a reuse-counter module 514, a reallocation module 504, a memory allocation component 150, a state machine 222, an on-die controller 220, a device controller 126, a device driver, other logic hardware and/or other executable code stored on a computer readable storage medium. Other embodiments may include similar or equivalent means for reallocating presently allocated storage regions.

In various embodiments, a means for storing metadata in a metadata structure may include a memory request module 502, a memory allocation component 150, a state machine 222 an on-die controller 220, a device controller 126, a device driver, other logic hardware and/or other executable code stored on a computer readable storage medium. Other embodiments may include similar or equivalent means for storing metadata in a metadata structure.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
   one or more storage elements comprising one or more storage regions; and
   a controller configured to:
   manage a metadata structure and a metadata change structure, wherein the metadata structure stores metadata relating to the one or more storage regions, the metadata describing mappings of physical addresses to logical addresses, and the metadata change structure comprises a queue of changes to be made to the metadata structure;

perform an availability check that determines whether to reallocate one or more presently allocated storage regions identified in the metadata change structure, wherein reallocation of presently allocated storage regions identified in the metadata change structure does not release reallocated storage regions to a free memory group of storage regions that are not identified in the metadata change structure; and reallocate a storage region from the one or more presently allocated storage regions based on the availability check.

2. The apparatus of claim 1, wherein the availability check determines if the storage region in the one or more presently allocated storage regions is erasable.

3. The apparatus of claim 2, wherein the storage region is erasable in response to the availability check determining that there is no valid data stored on the storage region.

4. The apparatus of claim 2, wherein the storage region is erasable in response to the availability check determining that an amount of valid data stored on the storage region is less than an amount specified by a valid data threshold.

5. The apparatus of claim 4, wherein the controller relocates valid data stored on the storage region to another storage region in response to the availability check determining that the amount of valid data stored on the storage region is less than the amount specified by the valid data threshold.

6. The apparatus of claim 2, wherein the storage region is a least recently used storage region in response to the availability check determining that a plurality of storage regions in the one or more presently allocated storage regions are erasable.

7. The apparatus of claim 1, wherein the controller increments a reuse counter associated with a storage region based on the storage region being reallocated from the one or more presently allocated storage regions.

8. The apparatus of claim 7, wherein the availability check determines to reallocate the storage region based on the reuse counter being less than a reallocation threshold.

9. The apparatus of claim 1, wherein the controller erases the storage region.

10. The apparatus of claim 1, where the controller is further configured to allocate a free storage region from the free memory group in response to the availability check determining not to reallocate one or more presently allocated storage regions.

11. A method comprising:
handling a plurality of memory requests, wherein changes to be made to a metadata structure that stores metadata relating to the plurality of memory requests are queued by a metadata change structure, the metadata describing mappings of physical addresses to logical addresses;
reallocating a presently allocated storage region without releasing the reallocated storage region to a free memory group of storage regions that are not identified in the metadata change structure, in response to a first memory request in the plurality of memory requests, based on the presently allocated storage region satisfying a validity threshold and a reallocation threshold, wherein the presently allocated storage region is identified in the metadata change structure; and
allocating a free storage region from the free memory group in response to a second memory request in the plurality of memory requests based on a determination that no presently allocated storage regions satisfy the validity threshold and the reallocation threshold.

12. The method of claim 11, wherein the presently allocated storage region satisfies the reallocation threshold based on a reuse counter for the presently allocated storage region being less than the reallocation threshold, wherein the reuse counter for the presently allocated storage region is incremented upon a reallocation of the presently allocated storage region.

13. The method of claim 11, wherein the presently allocated storage region satisfies the validity threshold based on the amount of valid data stored on the presently allocated storage region being less than the validity threshold.

14. The method of claim 11, wherein reallocating the presently allocated storage region comprises erasing data stored on the presently allocated storage region.

15. The method of claim 11, wherein reallocating the presently allocated storage region comprises relocating valid data stored on the presently allocated storage region to one or more other allocated storage regions.

16. The method of claim 11, further comprising selecting a least recently used presently allocated storage region in response to multiple presently allocated storage regions satisfying the validity threshold and the reallocation threshold.

17. The method of claim 11, further comprising incrementing a re-use counter associated with the presently allocated storage region in response to the reallocation of the presently allocated storage region.

18. An apparatus comprising:
means for storing changes to a metadata structure, wherein metadata in the metadata structure describes a mapping of physical addresses to logical addresses, and the means for storing changes to the metadata structure comprises a queue of changes to be made to the metadata structure;
means for comparing an amount of data stored on a previously allocated storage region against a validity threshold;
means for wear leveling for the previously allocated storage region based on a reuse counter associated with the previously allocated storage region being less than a reallocation threshold, the reallocation threshold defining a limit for how many times a presently allocated storage region can be reallocated; and
means for reallocating the presently allocated storage region without releasing the presently allocated storage region to a free memory group of storage regions that are not identified in the metadata change structure, based on the comparison of the presently allocated storage region against the validity threshold and the reallocation threshold, wherein the presently allocated storage region is identified in the means for storing changes to the metadata structure, prior to reallocating the presently allocated storage region.

* * * * *